United States Patent
Chang

(10) Patent No.: US 8,694,243 B2
(45) Date of Patent: Apr. 8, 2014

(54) OPTIMIZATION METHOD AND DEVICE FOR NAVIGATION DEVICE

(75) Inventor: Chih-Sung Chang, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 382 days.

(21) Appl. No.: 12/764,111

(22) Filed: Apr. 21, 2010

(65) Prior Publication Data

US 2010/0312467 A1 Dec. 9, 2010

(30) Foreign Application Priority Data

Jun. 8, 2009 (TW) ................................ 98119038 A

(51) Int. Cl.
*G01C 21/00* (2006.01)

(52) U.S. Cl.
USPC ........................................................ 701/416

(58) Field of Classification Search
None
See application file for complete search history.

(56) References Cited

U.S. PATENT DOCUMENTS

| 5,802,492 | A * | 9/1998 | DeLorme et al. | 455/456.5 |
| 6,278,938 | B1 * | 8/2001 | Alumbaugh | 701/438 |
| 2001/0055018 | A1 * | 12/2001 | Yaginuma et al. | 345/440 |
| 2009/0315767 | A1 * | 12/2009 | Scalisi et al. | 342/357.07 |

OTHER PUBLICATIONS

Office action mailed on Sep. 18, 2012 for the Taiwan application No. 098119038, p. 1 line 13-14, p. 2 line 1-5 and 7-15.
Office action mailed on Sep. 3, 2013 for the Taiwan application No. 098119038, filing date: Jun. 8, 2009, p. 2 line 3-12, line 14-24 and line 26 and p. 3 line 1-16 and line 21-23.

* cited by examiner

*Primary Examiner* — Thomas Tarcza
*Assistant Examiner* — Adam Alharbi
(74) *Attorney, Agent, or Firm* — Winston Hsu; Scott Margo

(57) ABSTRACT

An optimization method for a navigation device includes recording a plurality of coordinate variation data, analyzing the plurality of coordinate variation data to generate an analysis result, generating at least one behavior rule according to the analysis result, and adjusting a navigation result of the navigation device according to the at least one behavior rule.

11 Claims, 3 Drawing Sheets

OPTIMIZATION METHOD AND DEVICE FOR NAVIGATION DEVICE

BACKGROUND OF THE INVENTION

1. Field of the Invention

The present invention is related to a navigation optimization method and device and related navigation device, and more particularly, to a navigation optimization method and device and related navigation device capable of deriving behavior rules of a user from driving records of the user, so as to adjust navigation results.

2. Description of the Prior Art

With the advancement of technology, personal navigation devices (PNDs) are getting popular and widely used by consumers. In general, a PND performs route planning and navigation based upon existed map data and indications from a user.

With the PND, even if being in an unknown spot, the user can correctly and quickly reach a destination, such that time for finding the correct way can be decreased, as well as the opportunity of losing his/her way. In addition, in order to enhance reliability, the conventional PND usually updates the stored map data via specific media, such as internet, CD, memory card, etc., or according to information of new spots or coordinates manually inputted by the user. However, such an updating method cannot timely reflect the current traffic information, leading to a useless navigation result. For example, to relieve traffic, traffic rules in certain roads may be changed according to time and vehicle types. More specifically, in rush hours, a two-way road maybe adjusted to be a one-way road (i.e. including reversible lanes), to prohibit entrances of heavy vehicles, or to prohibit left turning. On the contrary, in off-peak hours, all these measures are cancelled. In such a situation, since the conventional PND can only make a route plan based upon normal traffic conditions, PND misguidance would happen over and over again and decrease utilization convenience due to practical traffic conditions.

SUMMARY OF THE INVENTION

It is therefore a primary objective of the claimed invention to provide a navigation optimization method and device and related navigation device.

The present invention discloses an optimization method for a navigation device. The optimization method comprises recording a plurality of coordinate variation data of the navigation device, analyzing the plurality of coordinate variation data to generate an analysis result, generating at least one behavior rule according to the analysis result, and adjusting a navigation result of the navigation device according to the at least one behavior rule.

The present invention further discloses an optimization device for a navigation device. The optimization device comprises a storage unit for recording a plurality of coordinate variation data of the navigation device, an analysis unit for analyzing the plurality of coordinate variation data to generate an analysis result, a rule generating unit for generating at least one behavior rule according to the analysis result, and a logic unit for adjusting a navigation result of the navigation device according to the at least one behavior rule.

The present invention further discloses a navigation device comprises an input interface for receiving a command for setting a target, a positioning device for acquiring a current coordinate information, a map database for storing a map data, a navigation processor for generating a navigation result according to the command, the current coordinate information and the map data, and an optimization device comprising a storage unit for receiving the plurality of coordinate information previously acquired by the positioning device to record a plurality of coordinate variation data of the navigation device, an analysis unit for analyzing the plurality of coordinate variation data to generate an analysis result, a rule generating unit for generating at least one behavior rule according to the analysis result, and a logic unit for adjusting the navigation result according to the at least one behavior rule.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
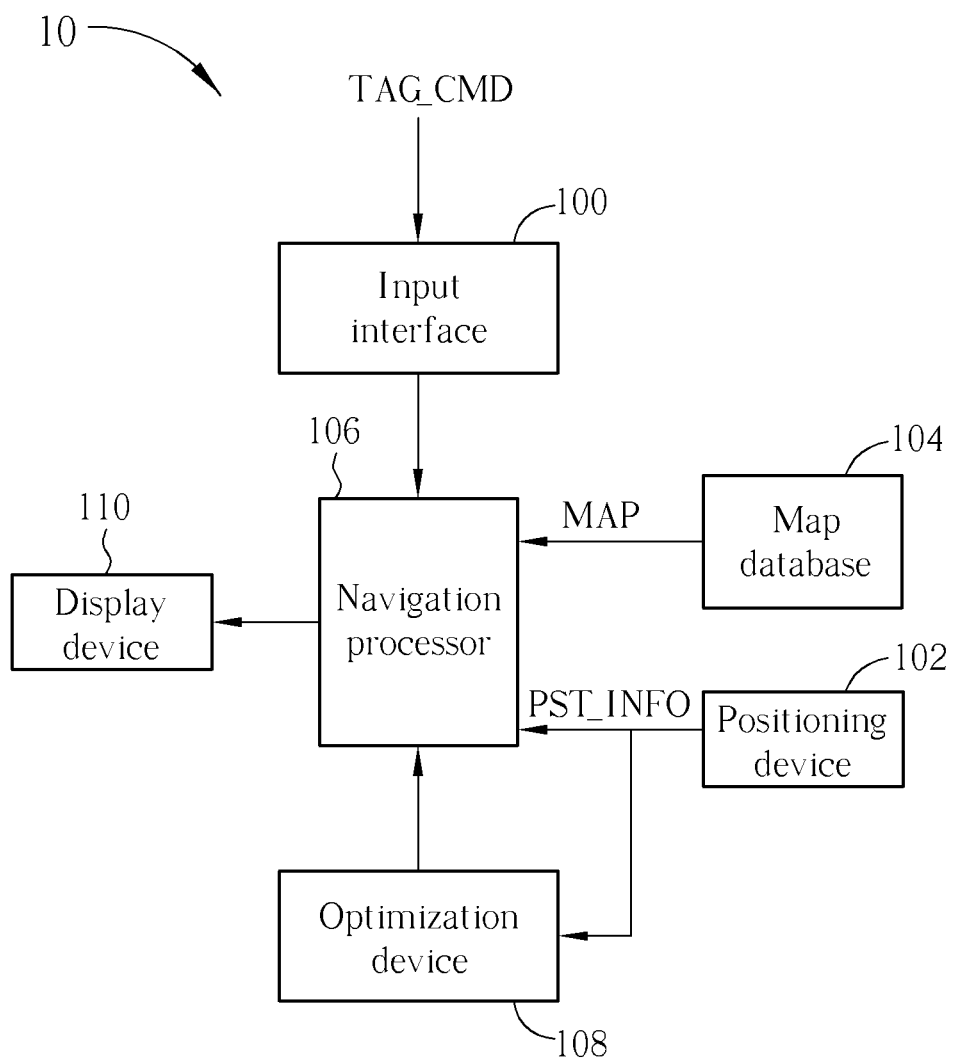
FIG. 1 is a schematic diagram of a navigation device according to an embodiment of the present invention.

Please refer to FIG. 1, which is a navigation device 10 according to an embodiment of the present invention. The navigation device 10 includes an input interface 100, a positioning device 102, a map database 104, a navigation processor 106, an optimization device 108 and a display device 110. The input interface 100 is utilized for receiving a command TAG_CMD inputted by a user for setting a target, i.e. destination of navigation. The positioning device 102 can be a global positioning system (GPS) receiver or the like, and is utilized for acquiring a coordinate information PST_INFO. The map database 104 is utilized for storing a map data MAP. The navigation processor 106 is utilized for generating a navigation result according to the command TAG_CMD, the coordinate information PST_INFO and the map data MAP. In addition, the optimization device 108 is utilized for determining behavior rules of the user according to the coordinate information PST_INFO acquired by the positioning device 102, and thereby adjusting the navigation result of the navigation processor 106. The display unit 110 is utilized for displaying the adjusted navigation result.

In short, the optimization device 108 determines the behavior rules of the user according to all coordinate information acquired by the positioning device 102 in a specific period, and accordingly adjusts the navigation result of the navigation processor 106, such that the navigation result can "automatically" conform to practical utilization conditions (traffic conditions) to timely update the map data MAP. For example, if the user always detours round a road during certain hours driving to an office, but does not do so during other hours, the optimization device 108 can determine that the road probably includes reversible lanes, is easily fallen into traffic jam or prohibited from entrances during the hours to the office, and generate corresponding behavior rules. As a result, the navigation processor 106 can accordingly adjust the navigation result to conform to the practical utilization conditions. In such a situation, the user does not need to set the navigation rules manually, while the navigation device 10 can automatically adjust the navigation result based upon past behaviors of the user.

Figure 2:
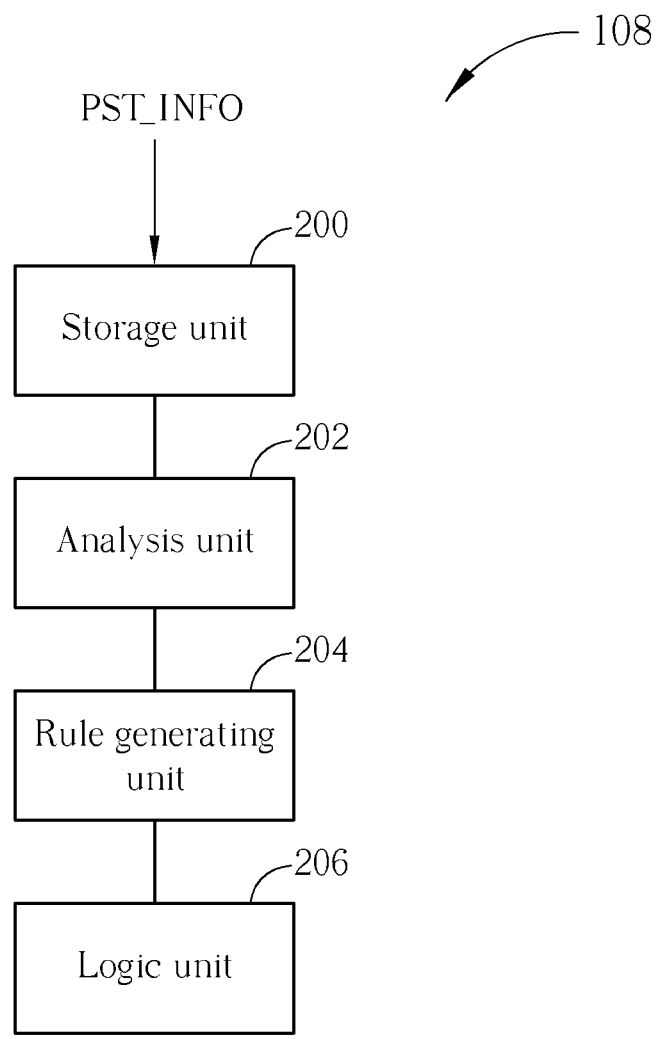
FIG. 2 is a schematic diagram of an optimization device shown in FIG. 1.

As to implementation, please refer to FIG. 2, which is a schematic diagram of the optimization device 108. The optimization device 108 includes a storage unit 200, an analysis unit 202, a rule generating unit 204 and a logic unit 206. The storage unit 200 is utilized for receiving the coordinate information PST_INFO previously acquired by the positioning device 102 to record a plurality of coordinate variation data of the navigation device 10. The analysis unit 202 is utilized for analyzing the coordinate variation data recorded by the storage unit 200 to generate an analysis result. The rule generating unit 204 is utilized for generating at least one behavior rule according to the analysis result of the analysis unit 202 and preferably storing the generated behavior rule. The logic unit 206 can be integrated into the navigation processor 106 or set separately, and is utilized for adjusting the navigation result according to the behavior rules generated by the rule generating unit 204, such that the navigation result can conform to the practical traffic conditions.

Note that, the optimization device 108 shown in FIG. 2 is merely an embodiment of the present invention, and can be varied and modified by those skilled in the art. For example, the analysis unit 202 can preferably adopt a data mining technique, which utilizes an association rule or a clustering rule to analyze the coordinate variation data stored in the storage unit 200. As understood by those skilled in the art, the data mining technique is a process including automatically or semi-automatically investigating and analyzing massive data, to acquire potential and useful information from a database, so as to build effective models and rules. Therefore, via the data mining technique, the analysis unit 202 can produce behavior modes of the user according to the coordinate variation data stored in the storage unit 200, such that the rule generating unit 204 can generate the corresponding behavior rules to optimize the navigation result.

Figure 3:
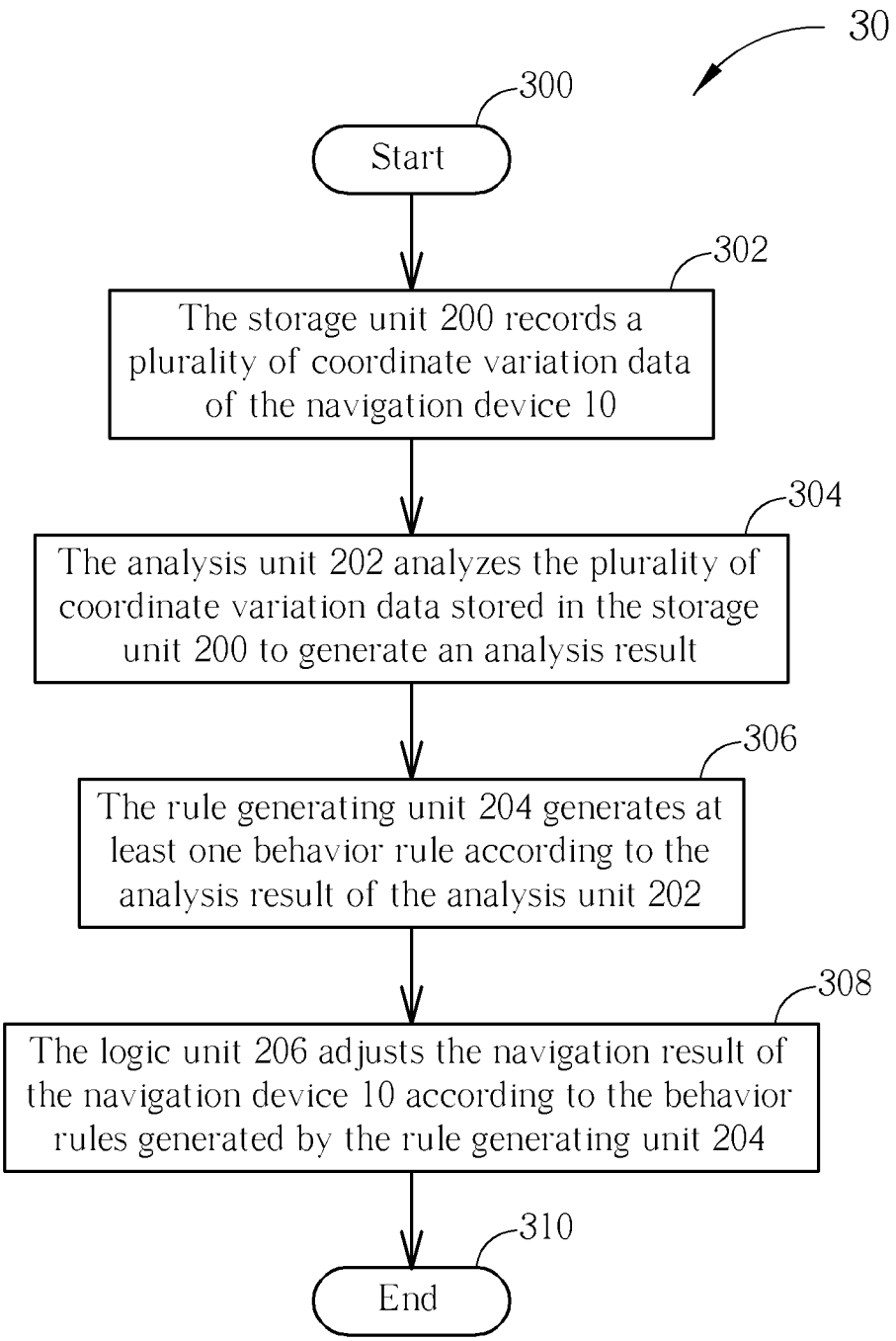
FIG. 3 is a schematic diagram of an optimization process of the optimization device shown in FIG. 2.

Operations of the optimization device 108 shown in FIG. 2 can be summarized into an optimization process 30, as illustrated in FIG. 3. The optimization process 30 includes the following steps:

Step 300: Start.

Step 302: The storage unit 200 records a plurality of coordinate variation data of the navigation device 10.

Step 304: The analysis unit 202 analyzes the plurality of coordinate variation data stored in the storage unit 200 to generate an analysis result.

Step 306: The rule generating unit 204 generates at least one behavior rule according to the analysis result of the analysis unit 202.

Step 308: The logic unit 206 adjusts the navigation result of the navigation device 10 according to the behavior rules generated by the rule generating unit 204.

Step 310: End.

In the prior art, the navigation device can only perform route planning based on normal traffic conditions. In comparison, in the present invention, the optimization 108 can analyze and summarize the utilization conditions of the user into the utilization behavior rules, so as to adjust the navigation result. In such a situation, the map data or the navigation rules are no longer necessary to be manually updated or set by the user but automatically derived from the driving records of the user; thus, utilization convenience is enhanced. More particularly, since the traffic conditions may be different due to vehicle type, location, country, etc., the following examples are given for describing the spirit of the present invention.

Example 1, each time the user drives an automobile through a road R1, the driving speed is less than 60 km/hr. The optimization device 108 can conclude that speed limit for automobiles in the road R1 is 60 km/hr.

Example 2, each time the user drives a truck through the road R1, the driving speed is less than 40 km/hr. The optimization device 108 can conclude that speed limit for trucks in the road R1 is 40 km/hr.

Example 3, every office attendance time, e.g. AM 7:00-9:00, Monday to Friday, the user drives an automobile and detours round a road R2 included in the best route plan, while at the remaining time, the user does not do so, then the optimization device 108 can conclude that the road R2 prohibits automobile entrance or is easily fallen in traffic jam during office attendance time.

Example 4, each time the user drives an automobile through a road R3, the user does not turn left to enter a road R4 included in the best route plan. The optimization device 108 can conclude that automobiles are prohibited from turning left from the road R3 to the road R4.

Example 5, each time the user drives a truck and detours round a road R5 included in the best route plan, but does not do so if the user does not drive the truck. The optimization device 108 can conclude that the road R5 prohibits truck entrance.

The above five examples are utilized for describing the spirit of the present invention, and can be varied and modified to meet different requirements. Besides, the data mining technique is a very common procedure for data analysis and generalization, and can be implemented in various ways as long as the goal of the present invention can be accomplished. Note that, the accuracy of the behavior rules increases as the quantity of sample data increases. For that reason, to minimize determination errors, the present invention can further include limitation of threshold counts, such as counts of data or times an identical situation happens. Take the situation in example 1 for instance, a limitation condition can be made as: if the user drives the automobile through the road R1 for more than 30 times, and at least 25 times among the 30 times, the driving speed is less than 60 km/hr, the optimization device 108 concludes that the speed limit for automobiles in the road R1 is 60 Km/hr.

In addition, the five examples generalize the navigation rules according to the driving records of one user. In fact, the present invention can further generalize the navigation rules in accordance with behavior modes of different users. That is, when the navigation device 10 is used by multiple users, the optimization device 108 can generalize each behavior mode of each user and thereby generate corresponding navigation rules. Certainly, the optimization device 108 can further summarize utilization conditions of all users into general navigation rules. These kinds of variations and modifications still belong to the present invention and can be further broadened if necessary.

On the other hand, in the present invention, the optimization device 108 does not integrate the traffic information into the map data, but generalizes the behavior rules according to the driving records of the user. Therefore, the present invention can be applied for different platforms with different map data. Furthermore, the optimization device 108 can be implemented by software, i.e. integrated with the existing navigation software of the navigation device 10 to decrease complexity.

To sum up, the present invention generalizes the behavior rules of the user according to driving records thereof, so as to adjust the navigation result, such that the navigation device can have learning ability, and achieve real-time adaptation, accuracy and diversity.

Those skilled in the art will readily observe that numerous modifications and alterations of the device and method may be made while retaining the teachings of the invention.

What is claimed is:

1. An optimization method for a navigation device comprising:
    recording a plurality of coordinate variation data of the navigation device;
    analyzing the plurality of coordinate variation data by a data mining technique to generate an analysis result, wherein the data mining technique is an association rule or a clustering rule;
    generating at least one behavior rule according to the analysis result; and
    adjusting, by a navigation processor, a route planning result of the navigation device according to the at least one behavior rule;
    wherein the route planning result indicates a route to a destination not yet reached by a user of the navigation device.

2. The optimization method of claim 1, wherein the plurality of coordinate variation data are acquired by a global positioning system receiver of the navigation device.

3. The optimization method of claim 1, wherein the step of generating the at least one behavior rule according to the analysis result further comprises storing the at least one behavior rule.

4. An optimization device for a navigation device comprising:
    a storage unit, for recording a plurality of coordinate variation data of the navigation device;
    an analysis unit, for analyzing the plurality of coordinate variation data by a data mining technique to generate an analysis result, wherein the data mining technique is an association rule or a clustering rule;
    a rule generating unit, for generating at least one behavior rule according to the analysis result; and
    a logic unit, for adjusting a route planning result of the navigation device according to the at least one behavior rule;
    wherein the route planning result indicates a route to a destination not yet reached by a user of the navigation device.

5. The optimization device of claim 4, wherein the plurality of coordinate variation data are acquired by a global positioning system receiver of the navigation device.

6. The optimization device of claim 4, wherein the rule generating unit is further utilized for storing the at least one behavior rule.

7. A navigation device comprising:
    an input interface, for receiving a command for setting a target;
    a positioning device, for acquiring a current coordinate information;
    a map database, for storing a map data;
    a navigation processor, for generating a route planning result according to the command, the current coordinate information and the map data; and
    an optimization device, comprising:
        a storage unit, for receiving the plurality of coordinate information previously acquired by the positioning device to record a plurality of coordinate variation data of the navigation device;
        an analysis unit, for analyzing the plurality of coordinate variation data by a data mining technique to generate an analysis result, wherein the data mining technique is an association rule or a clustering rule;
        a rule generating unit, for generating at least one behavior rule according to the analysis result; and
        a logic unit, for adjusting the route planning result according to the at least one behavior rule;
        wherein the route planning result indicates a route to a destination not yet reached by a user of the navigation device.

8. The navigation device of claim 7, wherein the positioning device is a global positioning system receiver.

9. The navigation device of claim 7, wherein the rule generating unit is further utilized for storing the at least one behavior rule.

10. The navigation device of claim 7, further comprising a display device, for displaying the route planning result adjusted by the logic unit.

11. The navigation device of claim 7, wherein the logic unit is integrated within the navigation processor.

* * * * *